(12) United States Patent
Kanchan

(10) Patent No.: US 11,038,455 B2
(45) Date of Patent: Jun. 15, 2021

(54) METHOD OF CONTROLLING A MOTOR

(71) Applicant: ABB Schweiz AG, Baden (CH)

(72) Inventor: Rahul Kanchan, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/600,120

(22) Filed: Oct. 11, 2019

(65) Prior Publication Data

US 2020/0127590 A1    Apr. 23, 2020

(30) Foreign Application Priority Data

Oct. 17, 2018   (EP) .................................... 18200917

(51) Int. Cl.
*H02P 23/26*        (2016.01)
(52) U.S. Cl.
CPC .......... *H02P 23/26* (2016.02); *H02P 2201/15* (2013.01)
(58) Field of Classification Search
CPC ............................. H02P 23/26; H02P 2201/15
USPC .................................................. 318/438, 34
See application file for complete search history.

(56) References Cited

U.S. PATENT DOCUMENTS

| | | | | |
|---|---|---|---|---|
| 7,906,925 B2 * | 3/2011 | Takeuchi | .................. | H02P 5/00 |
| | | | | 318/400.38 |
| 9,729,099 B1 * | 8/2017 | Lovas | ..................... | H02P 6/182 |
| 10,333,436 B2 * | 6/2019 | Chretien | ................. | H02P 21/22 |
| 2012/0319628 A1 | 12/2012 | Rongve | | |
| 2015/0002067 A1 | 1/2015 | Nondahl et al. | | |
| 2018/0138849 A1 | 5/2018 | Royak et al. | | |

FOREIGN PATENT DOCUMENTS

EP        2892148 A1    7/2015

OTHER PUBLICATIONS

European Search Report Application No. EP 18 20 0917 Completed: Dec. 17, 2018; dated Jan. 3, 2019 9 pages.
F. Bertoldi et al: "Quasi-Two-Level Converter for overvoltage mitigation in medium voltage drives", 2018 International Power Electronics Conference (IPEC-NIIGATA 2018—ECCE ASIA), May 20, 2018 XP055535346 pp. 488-494.

* cited by examiner

*Primary Examiner* — David Luo
(74) *Attorney, Agent, or Firm* — Whitmyer IP Group LLC

(57)    ABSTRACT

A method of performing scalar-based control of a motor connected to a power converter via at least one passive electrical reactance component, wherein the method includes: estimating a motor current at terminals of the motor to thereby obtain an estimated motor current, and controlling the power converter based on the estimated motor current.

19 Claims, 3 Drawing Sheets

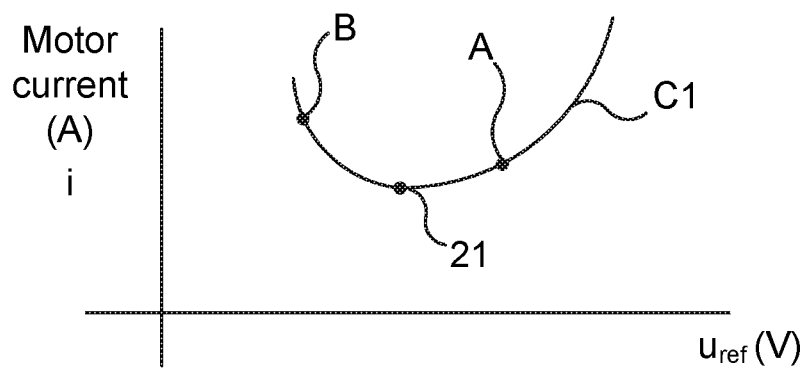
Fig. 3
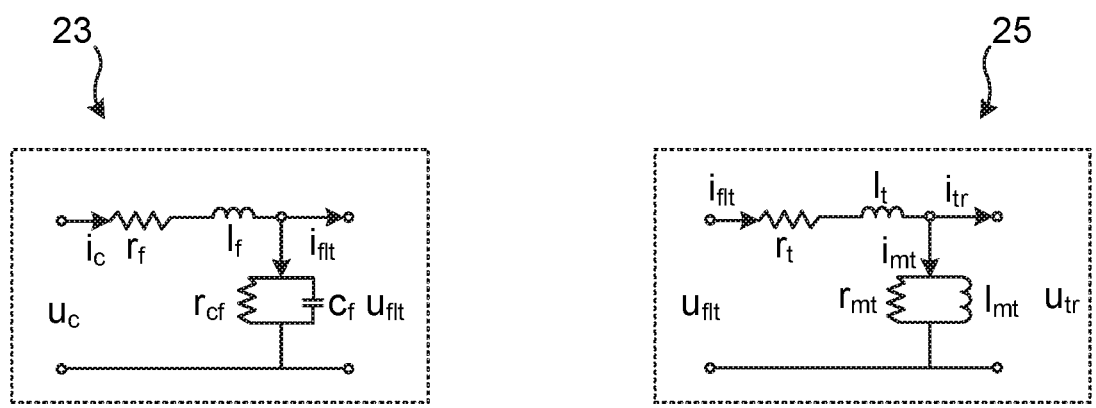
Fig. 4a
Fig. 4b
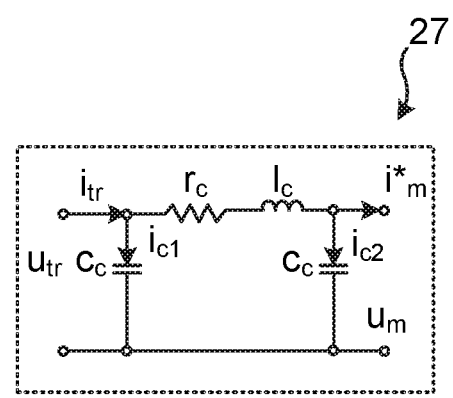
Fig. 4c

METHOD OF CONTROLLING A MOTOR

TECHNICAL FIELD

The present disclosure relates to motor control, in particular in applications where one or more passive components with reactance are connected between the motor and the power converter controlling the motor.

BACKGROUND

There are applications where a motor is connected to the power converter, which controls the motor, via one or more components with reactance. In oil and gas industry, for example, electrical submersible pumps (ESP) are very popular in downhole applications. An ESP typically operates at depths of 2-10 km with power supplied by long cables from the surface. In variable speed pumping applications, a variable speed drive (VSD) is used to supply power to the ESP motor. On the surface, the main equipment usually includes VSDs with an output sinusoidal filter, configured to run the ESP pump at variable speed.

ESP motors are typically medium voltage motors, in order to avoid excessive cable voltage drops and motor sizes. Therefore, power transmission to the ESP motor is typically done at a medium voltage level. Thus a medium voltage transformer is often installed at surface level, to step up the converter output voltage to a medium voltage level. At the downhole the ESP system may comprise an induction motor with special considerations to operate at the downhole environment conditions.

The driving of a motor from a distance of one or more kilometers provides challenges. This is because of the reactance between the VSD and the motor may make the measurable parameters available at the drive, and which are typically used for control, less relevant. There may for example be a large voltage drop over the long power line. US 2012/0319628 discloses a method for controlling a machine over a long line and aims to address this issue. The drive controller is arranged with circuits and/or control processes to provide AC current at a constant ratio of voltage and frequency to the machine or load. The drive controller maintains voltage and frequency at the machine terminals despite fluctuations in voltage and/or frequency that would ordinarily be caused by the load. This is done by estimating the voltage and current at the machine terminals and adapting the drive controller output accordingly to actively vary the converter output dependent on the load of the machine or other load. The method is however not suitable for all types of control strategies.

SUMMARY

In view of the above, an object of the present disclosure is to provide a method of controlling a motor which solves, or at least mitigates, the problems of the prior art.

There is hence according to a first aspect of the present disclosure provided a method of performing scalar-based control of a motor connected to a power converter via at least one passive electrical reactance component, wherein the method comprises: estimating a motor current at terminals of the motor to thereby obtain an estimated motor current, and controlling the power converter based on the estimated motor current.

This method is especially advantageous in search-based control which aims to minimize the motor current for a particular operating state of the motor.

One embodiment comprises prior to controlling, generating a voltage perturbation based on the estimated motor current, wherein the controlling is based on the voltage perturbation.

According to one embodiment the method is iterative and the estimating involves determining a first estimated motor current present during a previous voltage perturbation and a second estimated motor current present after the previous voltage perturbation has subsided, wherein prior to controlling, the method involves determining an offset signal based on a difference between the first estimated motor current and the second estimated motor current, and adding the offset signal to a search signal to generate the voltage perturbation.

The magnitude of the voltage perturbation is hence dependent on the offset signal which in turn is determined by the difference between the first estimated current and the second estimated current. The minimum motor current may iteratively be found in this manner due to the voltage-current characteristics of the motor. With each iteration the difference between the first estimated motor current and the second estimated motor current converges towards a minimum, meaning that the offset signal and thus the search signal will also converge. The voltage perturbation will in this case only minimally impact the motor current, and thus the minimum estimated motor current for a certain operating state of the motor is obtained. This is a so-called search based optimum control approach. Due to the lower current consumption, a more energy efficient solution may be provided. The operating temperature of the motor may also be reduced, whereby the operational lifetime of the motor may be prolonged.

According to one embodiment the voltage perturbation is used to adjust a voltage reference of a V/f controller for controlling the power converter.

According to one embodiment the controlling is performed by means of open loop control. In particular, in this case no speed measurement is obtained from the motor for feedback. This is characteristic for scalar control approaches.

According to one embodiment the estimating involves utilizing a model of the at least one passive electrical reactance component.

According to one embodiment the at least one passive electrical reactance component includes a filter, wherein the model comprises a filter model.

The filter may be an LC filter.

According to one embodiment the at least one passive electrical reactance component includes a transformer, wherein the model comprises a transformer model.

According to one embodiment the at least one passive electrical reactance component includes a cable having a length of the order of kilometers, wherein the model comprises a long cable model.

According to one embodiment the estimating involves estimating a filter output current and filter output voltage using a power converter current and a power converter voltage with the filter model, estimating a transformer output current and a transformer output voltage using the filter output current and the filter output voltage with the transformer model, and obtaining the estimated motor current the transformer output current and the transformer output voltage with the long cable model.

One embodiment comprises obtaining the power converter current and the power converter voltage by means of measurement. The power converter current and power converter voltage are typically readily available and may be detected by one or more sensors in the power converter.

According to one embodiment the motor drives an electrical submersible pump, ESP.

According to one embodiment the power converter is connected to the motor via a filter, a transformer and a cable, wherein the method comprises: comparing a natural frequency of a simplified model of the filter, the transformer, the cable, and the motor with a nominal speed of the motor, wherein the controlling is based on the estimated motor current only if the natural frequency is within a predetermined range from the nominal speed, and wherein in case the nominal speed is outside the predetermined range the controlling is based on a measured power converter current.

The nominal speed and the natural frequency may be compared by scaling one of these two quantities with $2\pi$.

It may for example happen that the estimated motor current and the measured power converter current are very close. In this case, the natural frequency will be outside the predetermined range, and the measured power converter current is beneficially used for controlling the power converter. Preferably, the step of comparing the natural frequency with the nominal speed of the motor may be performed prior to the steps of estimating a motor current at terminals of the motor, and controlling the power converter based on the estimated motor current. The natural frequency can be determined during the pre-commissioning phase, and a selector module can decide whether the estimated motor current or the measured power converter current is to be used for control.

The natural frequency can be determined based on the parallel inductances of the simplified model of the filter, the transformer, the long cable, and the motor and the capacitance of the filter.

The cable may have a length of the order of kilometers.

According to one example, when the natural frequency and the nominal frequency are outside the predetermined range, the motor current is measured during a previous voltage perturbation to obtain a first measured motor current and after the previous voltage perturbation has subsided to obtain a second measured motor current, wherein prior to controlling, the method involves determining an offset signal based on a difference between the first measured motor current and the second measured motor current, and adding the offset signal to a search signal to generate a voltage perturbation, wherein the controlling is based on this voltage perturbation.

There is according to a second aspect of the present disclosure provided a computer program comprising computer code which when executed by processing circuitry of a control system causes the control system to perform the steps of the method according to the first aspect.

There is according to a third aspect of the present disclosure provided a control system for performing scalar-based control of a motor connected to a power converter via at least one passive electrical component, wherein the control system comprises: processing circuitry, and a storage medium comprising computer code, wherein the control system is configured to perform the steps of the method according to the first aspect when the computer code is executed by the processing circuitry.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc.", unless explicitly stated otherwise.

BRIEF DESCRIPTION OF THE DRAWINGS

The specific embodiments of the inventive concept will now be described, by way of example, with reference to the accompanying drawings, in which:

FIG. 3 shows an example of a voltage-current curve of a motor;

FIGS. 4a-4c show examples of circuit diagrams/models of passive electrical reactance components;

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
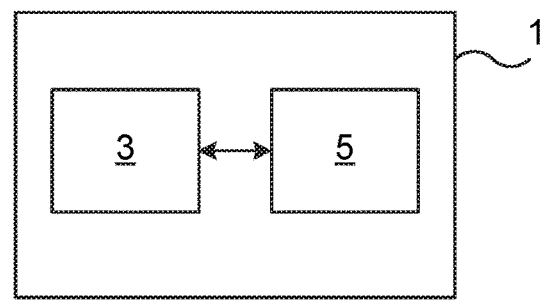
FIG. 1 schematically shows a block diagram of an example of a control system.

FIG. 1 shows an example of a control system 1 for controlling a motor by means of a power converter. In particular, the control system 1 is configured to be used in a power system in which there is at least one passive electrical reactance component connected between the power converter and the motor.

The control system 1 comprises a storage medium 3 and processing circuitry 5. The storage medium comprises computer code which when executed by the processing circuitry 5 causes the control system 1 to perform the steps of the methods described herein.

The storage medium 3 may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory.

The processing circuitry 5 may use any combination of one or more of a suitable central processing unit (CPU), multiprocessor, microcontroller, digital signal processor (DSP), application specific integrated circuit (ASIC), field programmable gate arrays (FPGA) etc., capable of executing any herein disclosed operations concerning control of a power converter.

Figure 2:
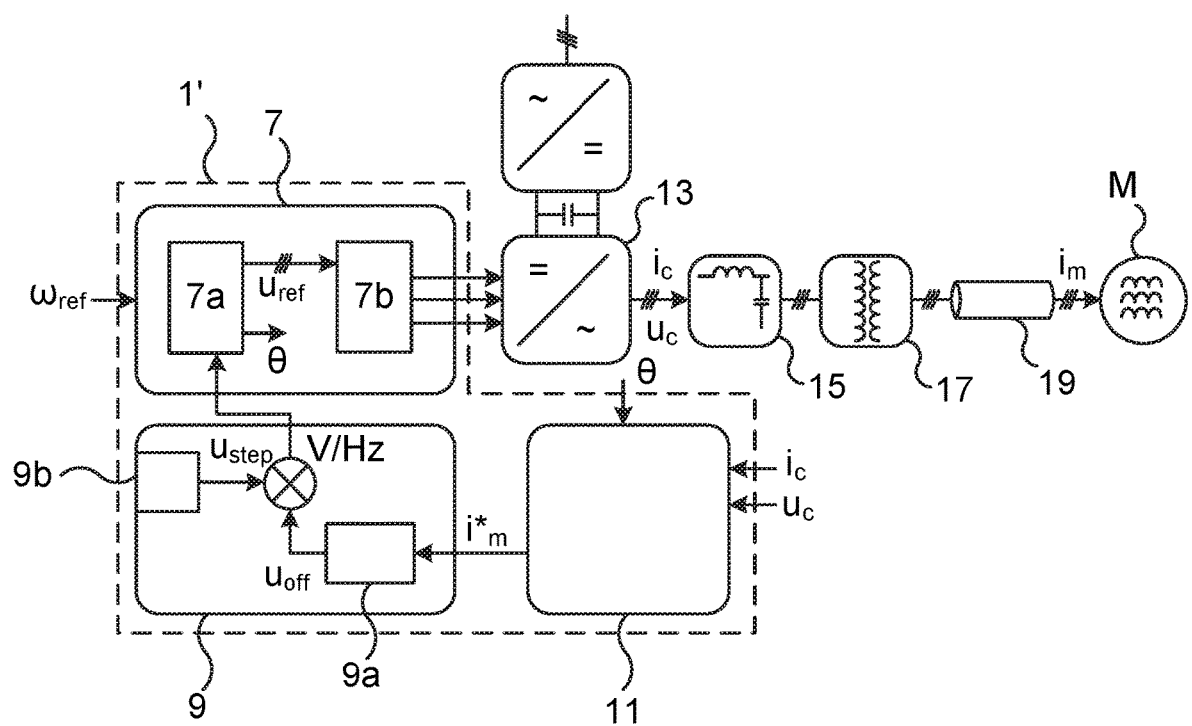
FIG. 2 shows in more detail a block diagram including one example of the control system in FIG. 1.

FIG. 2 shows an example of a particular realization of the control system 1, in terms of functional blocks. The functional blocks may be implemented in software and/or hardware.

In this example, control system 1' includes a V/f controller 7, also known as a V/Hz controller, a search module 9, and a motor current estimator 11. The V/f controller 7, the search module 9 and the motor current estimator 11 may for example operate in the per-unit system for simplicity. All quantities may hence be processed in per unit (p.u.).

The V/f controller 7 is a scalar-based controller. The V/f controller 7 may however according to some variations also include vector control aspects in addition to scalar-based control, i.e. utilizing d-q frame control. The exemplified V/f controller 7 comprises a voltage reference generator 7a configured to receive a speed reference $\omega_{ref}$, and a pulse width modulation (PWM) module 7b. The voltage reference generator 7a is configured to provide voltage references to the PWM module 7b. The PWM module 7b is configured to control switching of switches in a power converter 13. In the example in FIG. 1, the power converter 13 is an inverter. The switches may be electrical switches such as transistors, e.g. insulated gate bipolar transistors (IGBT), or metal oxide semiconductor field effect transistors (MOSFET).

The power converter 13 is configured to be connected to a motor M. The power converter 13 is in particular configured to be connected to the motor M via one or more passive electrical reactance components. In the present example, the power converter 13 is connected to the motor M via a filter 15, such as an LC filter, a transformer 17, such as a medium voltage step up transformer, and a cable 19, such as a medium voltage cable. The cable 19 is a long cable preferably having a length of the order of kilometers. The cable 19 may for example have a length that is at least 1,000 meters. It is to be noted that the passive electrical reactance components may alternatively have other compositions. For example, in one example there may only be a filter, e.g. an LC filter connected between the power converter and the motor. The particular configuration generally depends on the application. In ESP applications, typically the filter 15, the transformer 17 and the cable 19 would be passive electrical reactance components connected between the power converter 13 and the motor M.

The motor current estimator 11 is configured to estimate the motor current $i_m$ at the terminals of the motor M. An estimated motor current $i^*_m$ is thereby obtained. The motor current estimator 11 includes a model of the one or more passive electrical reactance components connected between the power converter 13 and the motor M.

The motor current estimator 11 is configured to send the estimated motor current $i^*_m$ to the search module 9. The search module 9 comprises an offset module 9a and a search signal generator module 9b. The search module 9 is configured to generate a voltage perturbation based on the estimated motor current $i^*_m$. The voltage perturbation is preferably a voltage step.

An example of the generation of the voltage perturbation will now be described. In a previous iteration of the method a previous voltage perturbation has been sent to the V/f controller 7, in particular to the voltage reference generator 7a, to adjust a voltage reference $u_{ref}$. This changes the amplitude of the voltage $u_c$ generated by the power converter 13. In the subsequent iteration of the method, the motor current estimator 11 estimates the motor current $i_m$ while the voltage perturbation is being applied, resulting in a first estimated motor current. The motor current estimator 11 subsequently also estimates the motor current $i_m$ when the voltage perturbation has subsided, i.e. after the voltage step. The offset module 9a obtains the first estimated motor current and the second estimated motor current and determines a difference between the first estimated motor current and the second estimated motor current. This difference is used to generate an offset signal $u_{off}$, in particular an offset voltage, which is added to a search signal $u_{step}$ generated by the search signal generator module 9b. The search signal $u_{step}$ may be a fixed voltage step. The search signal $u_{step}$ may for example be a square wave. A more detailed description of this search method is described in EP2892148 A1, of which paragraphs [0057]-[0063] are incorporated herein by reference.

The voltage perturbation is sent to the V/f controller 7 to adjust the voltage reference $u_{ref}$. The voltage reference $u_{ref}$ is used to generate three phase reference signals which are provided to the PWM module 7b for controlling the power converter 13. This process is performed iteratively during operation of the motor M. As the above-described search process is performed, the offset signal converges to a value which provides a minimum estimated motor current for a particular operating state of the motor M.

FIG. 3 shows an example of a voltage-current characteristics curve C1 for an operating state, i.e. speed, of the motor M. Curve C1 has a minimum motor current at point 21. By applying the voltage perturbation, the estimated motor current will move to the left/right along curve C1 e.g. from point A or point B towards point 21, as the method is being iteratively performed. Depending on the location on the voltage-current curve and on the magnitude of the voltage perturbation, the motor current and thus also the estimated motor current will either increase or decrease. Eventually, the estimated motor current will reach the point 21.

An example of the motor current estimator 11 will now be described in more detail with reference to FIGS. 4a-4c. It is to be noted that the circuits/models depicted in FIGS. 4a-4c merely constitute one example of passive electrical reactance components connected between the power converter 13 and the motor M.

It may be noted that all current and voltage quantities described below are complex vectorial quantities having real and imaginary parts.

The motor current estimator 11 models the passive electrical reactance component(s) connected between the power converter 13 and the motor M. The model configuration is hence dependent of the particular power converter/motor set-up. The examples shown in FIGS. 4a-4c correspond to the passive electrical reactance components shown in FIG. 2. Thus, the exemplified motor current estimator 11 comprises a filter model 23 of the filter 15, i.e. a model of an LC filter, a transformer model 25 of the transformer 17, and a long cable model 27 of the cable 19. The filter model 23 may for example be constituted by the following equations:

$$u_{flt} = u_c - i_c r_f - j\omega l_f i_c \qquad (1)$$

$$i_{flt} = i_c - \frac{u_{flt}}{r_{cf}} - j\omega c_f u_{flt} \qquad (2)$$

where $i_c$ is the measured power converter current, $l_f$ is the inductance of the filter 13, $r_f$ and $r_{cf}$ are resistances of the filter 13, $\omega$ is the nominal motor speed, $u_{flt}$ is the filter output voltage and $i_{flt}$ is the filter output current. The filter output voltage $u_{flt}$ and the filter output current $i_{flt}$ form the input signals for the passive electrical reactance component model connected directly downstream of the filter 13, in case additional passive electrical reactance components are connected between the power converter and the motor downstream of the filter 13. Otherwise, the filter output current $i_{flt}$ is the estimated motor current. In the example in FIG. 2, the filter output voltage $u_{flt}$ and the filter output current $i_{flt}$ form input signals of the transformer 17.

The transformer model 25 in steady state may for example be constituted by the following equations:

$$u_{tr} = u_{flt} - i_{flt}r_t - j\omega l_t i_{flt} \quad (3)$$

$$i_{tr} = i_{flt} - \frac{u_{tr}}{r_{mt}} - \frac{u_{tr}}{j\omega l_{mt}} \quad (4)$$

where $u_{tr}$ is the transformer output voltage and $i_{tr}$ is the transformer output current, $r_t$ and $r_{mt}$ are resistances of the transformer 17, and $l_t$ and $l_{mt}$ are the inductances of the transformer 17, with the inductance $l_{mt}$ and the resistance $r_{mt}$ forming the excitation circuit of the transformer 17. In a simplified variation of the model of the transformer 17, the transformer excitation circuit components may be discarded, which results in that equation (4) would be $i_{tr}=i_{flt}$. The transformer output voltage $u_{tr}$ and the transformer output current $i_{tr}$ are used as input signals for the passive electrical reactance component connected directly downstream of the transformer 17 in case additional passive electrical reactance components are connected between the power converter and the motor downstream of the transformer 17. Otherwise, the transformer output current $i_{tr}$ is the estimated motor current.

In the example in FIG. 2, the transformer output voltage $u_{tr}$ and the transformer output current $i_{tr}$ form input signals of the cable 19.

The long cable model 27 may for example be a π model, and may be constituted by the following equations:

$$i_{c1} = \frac{u_{tr}}{r_c} + j\omega c_c u_{tr} \quad (5)$$

$$i_{cl} = (i_{tr} - i_{c1}) \quad (6)$$

$$u_m = u_{tr} - i_{cl}r_c - j\omega l_c i_{cl} \quad (7)$$

$$i_m^* = i_{cl} - \frac{u_m}{r_c} - j\omega c_c u_m \quad (8)$$

where $i_{c1}$ and $i_{c2}$ are not actual cable leakage currents but represent fictitious currents through shunt components of the π model, $l_c$ is the cable inductance, $r_c$ is the cable resistance, $u_m$ is the motor voltage and $i^*_m$ is the estimated motor current.

The calculations of the equations may be carried out sequentially. In particular, in the example in FIG. 2, the filter output current $i_{flt}$ and filter output voltage $u_{flt}$ may first be determined using the filter model 23 and the measured power converter current $i_c$ and power converter voltage $u_c$. Next, the transformer output current $i_{tr}$ and a transformer output voltage $u_{tr}$ are determined using the transformer model 25 and the filter output current $i_{flt}$ and the filter output voltage $u_{flt}$. The motor current is then estimated based on the transformer output current $i_{tr}$ and the transformer output voltage $u_{tr}$ using the long cable model 27 to obtain the estimated motor current $i^*_m$. The estimated motor current $i^*_m$ is, as previously described, provided to the search module 9 from the motor current estimator 11. Furthermore, motor current estimation is preferably performed both during the voltage perturbation, which changes the power converter voltage, and after the voltage perturbation has subsided to obtain the first estimated motor current and the second estimated motor current, respectively, for processing by the offset module 9a.

Figure 5:
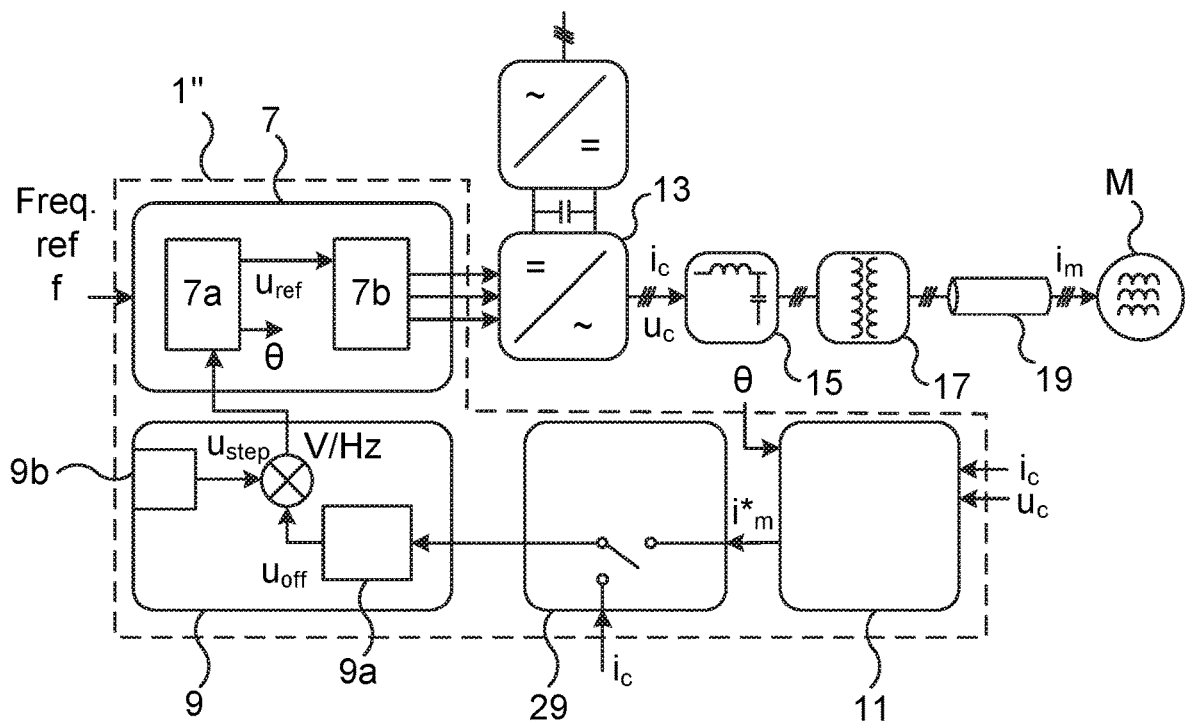
FIG. 5 shows a variation of the control system depicted in FIG. 2.

FIG. 5 shows another example of the control system 1 in FIG. 1. This example is almost identical to the one described with reference to FIG. 2. The control system 1" however also includes a selector module 29. The motor current estimator 11 is configured to provide the estimated motor current $i^*_m$ to the selector module 29. The selector module 29 is configured to receive the measured power converter current $i_c$. The selector module 29 is configured to determine which one of the measured power converter current $i_c$ and the estimated motor current $i^*_m$ is to be provided to the search module 9. The search module 9 performs the same type of processing described above, based on either the measured power converter current $i_c$ or the estimated motor current $i^*_m$, as selected by the selector module 29.

The selector module 29 is configured to compare a natural frequency $F_R$ of a simplified model of the filter 15, the transformer 17, the cable 19, and the motor M with a nominal speed of the motor M. Preferably, either the natural frequency $F_R$ is scaled by a multiplication with $2\pi$ or the nominal speed is scaled by a division with $2\pi$ before the comparison. The nominal speed of the motor M may be the nominal speed according to the face plate of the motor M.

Figure 6:
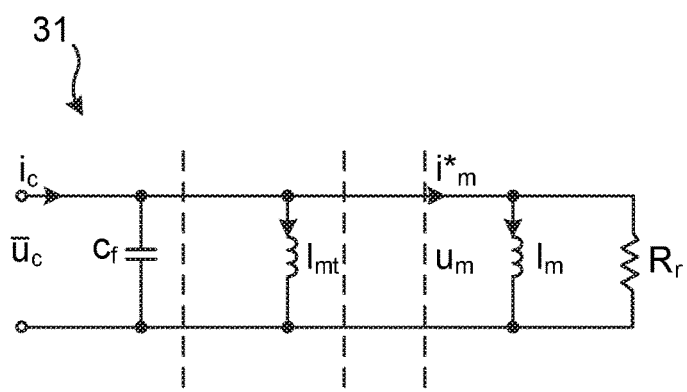
FIG. 6 is a schematic simplified model of a plurality of passive electrical reactance components.

FIG. 6 shows a simplified model 31 of the filter, the transformer and the long cable. The natural frequency $F_R$ may be obtained by means of the following equation:

$$F_R = \frac{1}{2\pi\sqrt{L_{eq}C_f}}$$

where $L_{eq}$ is $l_m$ in parallel with $l_{mt}$ is the equivalent inductance of the circuit and where $l_m$ is the magnetizing branch inductance of the motor M and $l_{mt}$ is the inductance of the transformer 17.

In case the natural frequency $F_R$ is within a predetermined range from the nominal speed of the motor M the selector module 29 is configured to be set such that the estimated motor current $i^*_m$ is sent to the search module 9 for processing to obtain the voltage perturbation. Otherwise, the selector module 29 is configured to be set such that the measured power converter current $i_c$ is sent to the search module 9 for processing to obtain the voltage perturbation in the same manner as has been described above.

The predetermined range may for example be the nominal speed of the motor M plus 2π*100 radians per second or 100 Hz, such as the nominal speed of the motor M plus 2π*90 radians per second or 90 Hz, plus 2π*80 radians per second or 80 Hz, plus 2π*70 radians per second or 70 Hz, plus 2π*60 radians per second or 60 Hz, plus 2π*50 radians per second or 50 Hz, plus 2π*40 radians per second or 40 Hz, plus 2π*30 radians per second or 30 Hz, or plus 2π*20 radians per second or 20 Hz.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A method of performing scalar-based control of a motor connected to a power converter via at least one passive electrical reactance component, wherein the method comprises:

estimating a motor current at terminals of the motor to thereby obtain an estimated motor current, and controlling the power converter based on the estimated motor current,
wherein the method comprises, prior to controlling, generating a voltage perturbation based on the estimated motor current, wherein the controlling is based on the voltage perturbation.

2. The method as claimed in claim 1, wherein the method is iterative and the estimating involves determining a first estimated motor current present during a previous voltage perturbation and a second estimated motor current present after the previous voltage perturbation has subsided, wherein prior to controlling, the method involves determining an offset signal based on a difference between the first estimated motor current and the second estimated motor current, and adding the offset signal to a search signal to generate the voltage perturbation.

3. The method as claimed in claim 1, wherein the voltage perturbation is used to adjust a voltage reference of a V/f controller for controlling the power converter.

4. The method as claimed in claim 1, wherein the controlling is performed by means of open loop control.

5. The method as claimed in claim 1, wherein the estimating involves utilizing a model of the at least one passive electrical reactance component.

6. The method as claimed in claim 1,
wherein the estimating involves utilizing a model of the at least one passive electrical reactance component,
wherein the at least one passive electrical reactance component includes a filter, wherein the model includes a filter model,
wherein the at least one passive electrical reactance component includes a transformer, wherein the model includes a transformer model,
wherein the at least one passive electrical reactance component includes a cable having a length of the order of kilometers, wherein the model includes a long cable model, and
wherein the estimating involves estimating a filter output current and filter output voltage using a power converter current and a power converter voltage with the filter model, estimating a transformer output current and a transformer output voltage using the filter output current and the filter output voltage with the transformer model, and obtaining the estimated motor current using the transformer output current and the transformer output voltage with the long cable model.

7. The method as claimed in claim 6, comprising obtaining the power converter current and the power converter voltage by means of at least one measurement.

8. The method as claimed in claim 1, wherein the motor drives an electrical submersible pump, ESP.

9. The method as claimed in claim 1, wherein the power converter is connected to the motor via a filter, a transformer and a cable, wherein the method further comprises:
comparing a natural frequency of a simplified model of the filter, the transformer, the cable, and the motor with a nominal speed of the motor,
wherein the controlling is based on the estimated motor current only if the natural frequency is within a predetermined range from the nominal speed, and wherein in case the natural frequency is outside the predetermined range the controlling is based on a measured power converter current.

10. A computer program comprising computer code which when executed by processing circuitry of a control system causes the control system to perform the steps of the method as claimed in claim 1.

11. A method of performing scalar-based control of a motor connected to a power converter via at least one passive electrical reactance component, wherein the method comprises:
estimating a motor current at terminals of the motor to thereby obtain an estimated motor current, and
controlling the power converter based on the estimated motor current,
wherein the estimating involves utilizing a model of the at least one passive electrical reactance component, and
wherein the at least one passive electrical reactance component includes at least one of the following: a filter, a transformer, and a cable having a length of the order of kilometers.

12. A control system for performing scalar-based control of a motor connected to a power converter via at least one passive electrical reactance component, wherein the control system comprises:
processing circuitry, and
a storage medium including computer code,
wherein, when the computer code is executed by the processing circuitry, the control system is configured to perform steps of:
estimating a motor current at terminals of the motor to thereby obtain an estimated motor current,
controlling the power converter based on the estimated motor current, and
prior to controlling, generating a voltage perturbation based on the estimated motor current, wherein the controlling is based on the voltage perturbation.

13. The control system as claimed in claim 12, wherein the steps are iterative and the estimating involves determining a first estimated motor current present during a previous voltage perturbation and a second estimated motor current present after the previous voltage perturbation has subsided, wherein prior to controlling, the control system determines an offset signal based on a difference between the first estimated motor current and the second estimated motor current, and adds the offset signal to a search signal to generate the voltage perturbation.

14. The control system as claimed in claim 12, wherein the voltage perturbation is used to adjust a voltage reference of a V/f controller for controlling the power converter.

15. The control system as claimed in claim 12, wherein the controlling is performed by means of open loop control.

16. The control system as claimed in claim 12, wherein the estimating involves utilizing a model of the at least one passive electrical reactance component.

17. The control system as claimed in claim 12,
wherein the estimating involves utilizing a model of the at least one passive electrical reactance component,
wherein the at least one passive electrical reactance component includes a filter, wherein the model includes a filter model,
wherein the at least one passive electrical reactance component includes a transformer, wherein the model includes a transformer model,
wherein the at least one passive electrical reactance component includes a cable having a length of the order of kilometers, wherein the model includes a long cable model, and
wherein the estimating involves estimating a filter output current and filter output voltage using a power converter current and a power converter voltage with the filter model, estimating a transformer output current and a transformer output voltage using the filter output current and the filter output voltage with the transformer model, and obtaining the estimated motor current using the transformer output current and the transformer output voltage with the long cable model.

18. The control system as claimed in claim 12, wherein the control system obtains the power converter current and the power converter voltage by means of at least one measurement.

19. The control system as claimed in claim 12, wherein the power converter is connected to the motor via a filter, a transformer and a cable, wherein the control system compares a natural frequency of a simplified model of the filter, the transformer, the cable, and the motor with a nominal speed of the motor, wherein the controlling is based on the estimated motor current only if the natural frequency is within a predetermined range from the nominal speed, and wherein in case the natural frequency is outside the predetermined range the controlling is based on a measured power converter current.

\* \* \* \* \*